(12) United States Patent
Tolbert

(10) Patent No.: US 11,826,293 B1
(45) Date of Patent: Nov. 28, 2023

(54) WHEEL BRUSH FOR A WHEELCHAIR

(71) Applicant: Billy Tolbert, Evergreen, AL (US)

(72) Inventor: Billy Tolbert, Evergreen, AL (US)

( * ) Notice: Subject to any disclaimer, the term of this patent is extended or adjusted under 35 U.S.C. 154(b) by 634 days.

(21) Appl. No.: 17/089,866

(22) Filed: Nov. 5, 2020

(51) Int. Cl.
*B60S 1/68* (2006.01)
*A61G 5/10* (2006.01)
*B60S 3/04* (2006.01)

(52) U.S. Cl.
CPC .............. *A61G 5/1035* (2013.01); *B60S 1/68* (2013.01)

(58) Field of Classification Search
CPC ................................ A61G 5/1035; B60S 1/68
See application file for complete search history.

(56) References Cited

U.S. PATENT DOCUMENTS

| | | | | |
|---|---|---|---|---|
| 725,843 A * | 4/1903 | Henn, Jr. | ................ | A46B 9/02 15/160 |
| 3,231,293 A * | 1/1966 | Loustaunau | ............ | A61G 5/10 280/211 |
| 4,605,239 A * | 8/1986 | Warfel | .................... | A61G 5/10 15/160 |
| 5,566,420 A * | 10/1996 | Specht | ...................... | B60S 1/68 15/256.51 |
| 5,857,238 A * | 1/1999 | Jmill | ...................... | A46B 9/00 15/88.1 |
| 5,964,002 A * | 10/1999 | Schaal | ..................... | B08B 1/04 15/97.1 |
| 6,434,781 B1 * | 8/2002 | Guerra | .................. | A63B 57/60 280/DIG. 6 |
| 6,776,698 B2 * | 8/2004 | Pepin | ....................... | B60S 1/68 15/160 |
| 9,346,438 B1 * | 5/2016 | Parker, III | ............... | B60S 1/68 |
| 9,358,959 B2 * | 6/2016 | Majka | ..................... | B62J 50/15 |
| 9,718,446 B1 * | 8/2017 | Tolbert | .................... | A61G 5/10 |
| 10,441,080 B2 * | 10/2019 | Hall | ....................... | A47C 7/006 |
| 11,285,922 B1 * | 3/2022 | Tolbert | .................... | B60S 1/68 |
| 11,357,678 B1 * | 6/2022 | Tolbert | ................ | A46B 5/0095 |
| 11,446,718 B2 * | 9/2022 | Ayres | ........................ | B08B 3/08 |
| 2008/0258451 A1 * | 10/2008 | Thygesen | ............... | A61G 5/10 280/855 |
| 2014/0284911 A1 * | 9/2014 | Kueppers | ............... | B60S 1/685 280/855 |
| 2017/0203735 A1 * | 7/2017 | Tolbert | .................... | B60S 3/041 |

(Continued)

FOREIGN PATENT DOCUMENTS

| CN | 115339416 A * | 11/2022 | | |
|---|---|---|---|---|
| DE | 102018102739 A1 * | 8/2019 | ............... | A61G 5/10 |

(Continued)

*Primary Examiner* — Marc Carlson
(74) *Attorney, Agent, or Firm* — Peter Loffler

(57) ABSTRACT

A wheel brush for a wheelchair has a brush assembly that is slidably disposed within a main housing and biased therein via a spring. A brush head is held within one end of the brush assembly so that a portion of the bristles of the assembly extend beyond an open end of the main housing. The device is attached to a brake arm of the wheelchair via a mount member that has a channel such that the brake arm is received within the channel. The wheellock assembly pushes the device toward a rear wheel of the wheelchair such that the bristles engage the wheel and brush dirt off the wheel as the wheelchair rolls being biased thereonto by the spring. The mount member acts as the brake arm for the wheelchair.

18 Claims, 6 Drawing Sheets

(56) References Cited

U.S. PATENT DOCUMENTS

| | | | |
|---|---|---|---|
| 2021/0161741 A1* | 6/2021 | Peskin | A61G 5/0816 |
| 2021/0291794 A1* | 9/2021 | Paad | A61G 5/1054 |
| 2022/0258698 A1* | 8/2022 | Gautreau | B60S 1/68 |

FOREIGN PATENT DOCUMENTS

| | | | | |
|---|---|---|---|---|
| FR | 2856358 A1 * | 12/2004 | | B60S 1/68 |
| KR | 20170123802 A * | 11/2017 | | |
| WO | WO-2006056207 A1 * | 6/2006 | | A61G 5/10 |

\* cited by examiner

WHEEL BRUSH FOR A WHEELCHAIR

BACKGROUND OF THE INVENTION

1. Field of the Invention

The present invention relates to a brush that attaches to a vertical rearwardly located post of an armrest of a wheelchair wherein the brush acts upon and cleans a main wheel of the wheelchair.

2. Background of the Prior Art

Typical wheelchairs have a pair of rear or main wheels and a pair of front or caster wheels. In a manual wheelchair, the main wheels act as the drive wheels that are driven by the user of the wheelchair wherein the user grasps a push ring that is concentric with the rear wheel and places force on the push ring in order to turn the main wheel in response. Each main wheel is similarly configured—of course the wheelchair can also be locomoted by another person pushing or pulling the wheelchair via rearwardly situated push handles. The caster wheels, which tend to be substantially smaller than the main wheels, are swivelly attached to the frame of the wheelchair and assist in turning of the wheelchair with the actual steering being accomplished via uneven force or opposing forces being placed on the two push rings. This wheelchair architecture proves adequate and versatile for many wheelchair users.

One of the problems experienced by users of these types of wheelchairs is getting dirt on the outer periphery—the tread—of the main wheels, often from using the wheelchair outside but sometimes from indoor use as well. Such dirt poses certain problems including making for a bumpy ride, especially if the dirt gets caked onto the wheel, making the wheelchair slippery and difficult to maneuver which can be especially problematic in descent mode, and the problem of getting the floor on which the wheelchair rides dirty, which is especially problematic when using the wheelchair indoors.

Additionally, due to the proximity of the push ring to its main wheel, many users frequently come in contact with the main wheel during locomotion so that some of the dirt transfers to the user's hands and lower arm regions.

If a user resides in a facility such as an assisted living facility or nursing home, the user can ask staff to help clean the wheels when they get dirty. While effective, staff may not be readily available, especially if the user is traveling remote of the facility such as a trip to the mall. Some users can ask their home located significant other to correct the dirty wheel problem, which also suffers from the problem of significant other (or other caretaker) not being present when needed. Some users attempt to address the problem themselves by cleaning the wheel as needed. While often effective, this solution is time-consuming and often frustrating for the user and requires the user to be prepared with an appropriate implement for the job such as a cleaning rag which itself must be transported until appropriately discarded.

To address these problems, devices have been proposed which automatically clean the main wheels of a wheelchair whenever the wheelchair is in motion. Such devices, which come in a wide variety of architectures and work with varying degrees of efficiency, suffer from certain drawbacks.

Many such devices are relatively complex in design and construction so that manufacture of such devices is expensive making the device cost-prohibitive. Some devices add a noticeable drag or rolling resistance to the wheelchair requiring the user, or his or her attendant if the wheelchair is being pushed, to work harder to overcome this resistance. Some devices require alterations be made to the wheelchair to install the device which alterations many users are not willing to make, especially if the wheelchair does not belong to the user.

What is needed is a wheelchair brush that cleans the main wheels of a wheelchair which overcomes the above-stated shortcomings found in the art. Specifically, such as device must be of relatively simple design and construction so as to be easy to install, use and maintain. Such a device must not significantly increase the rolling resistance of the wheel which the device services. Such a device must not require a permanent alteration be made to the wheelchair for proper usage of the device.

SUMMARY OF THE INVENTION

The wheel brush for a wheelchair of the present invention, which increases the versatility of my previous patent for a Wheel Brush for a Wheelchair, U.S. Pat. No. 9,718,468, issued on Aug. 1, 2017, which patent is incorporated herein by reference in its entirety, addresses the aforementioned needs in the art by providing a brush that is removably attached to a wheelchair and cleans a main wheel of the wheelchair whenever the wheelchair is in motion. The wheel brush for a wheelchair is of relatively simple design and construction, being produced using standard manufacturing techniques, so that the device is relatively inexpensive to produce so as to be economically attractive to potential consumers for this type of device. The wheel brush for a wheelchair adds negligible rolling resistance to the wheel that the device is servicing so that many users will not differentiate between the device's presence and absence from a workload requirement on the push ring. The wheel brush for a wheelchair is removably attached to the wheelchair without the need for special tools or training and does not require any permanent alteration be made to the wheelchair.

The wheel brush for a wheelchair of the present invention is comprised of a main housing that has a closed back end and an open front end and a hollow interior. A mount member has an outside edge and is attached to a surface of the main housing. The mount member has a mounting channel that runs transverse to a longitudinal axis of the main housing. The mounting channel is dimensioned to receive the brake arm of a wheelchair therein. A body member has a first end with a transverse channel and a second end and a stop plate therebetween. The body member is slidably disposed within the main housing. A brush head has a series of bristles. The brush head is slidably received within the transverse channel of the body member and is held thereat in dovetail fashion such that a portion of the bristles extends outside of the front end of the main housing. A spring has a first end abutting the back end of the main housing and an opposing second end abutting the stop plate of the body member. The mount member is attached to the brake arm of the wheellock assembly of the wheelchair by sliding the channel of the mount member over the brake arm so that the bristles are facing the rear wheel and the spring biases the bristles toward the rear wheel. The outside edge of the mount member is positioned beyond the front end of the main housing so that when the wheellock assembly of the wheelchair is in a fully locked position, the outside edge of the mount member frictionally engages the rear wheel. The mount member is attached to the surface of the main housing via a post such that the post is oriented at a non-right angle with respect to the surface of the main housing. The main housing is rectangular in shape as is the body member.

BRIEF DESCRIPTION OF THE DRAWINGS

Similar reference numerals refer to similar parts throughout the several views of the drawings.

DESCRIPTION OF THE PREFERRED EMBODIMENT

Figure 1:
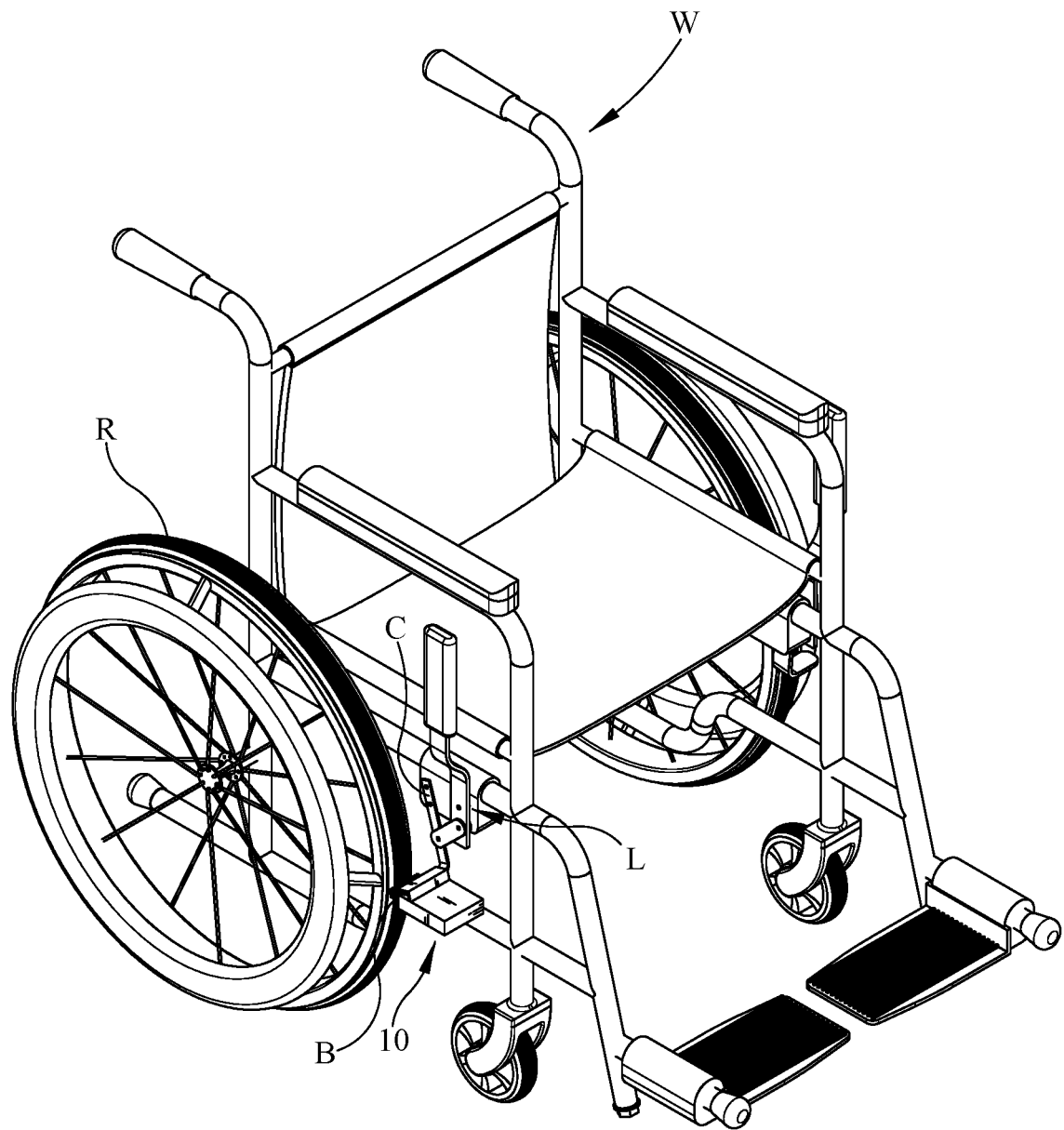
FIG. 1 is an environmental view of the wheel brush for a wheelchair of the present invention installed on a wheelchair.
Figure 2:
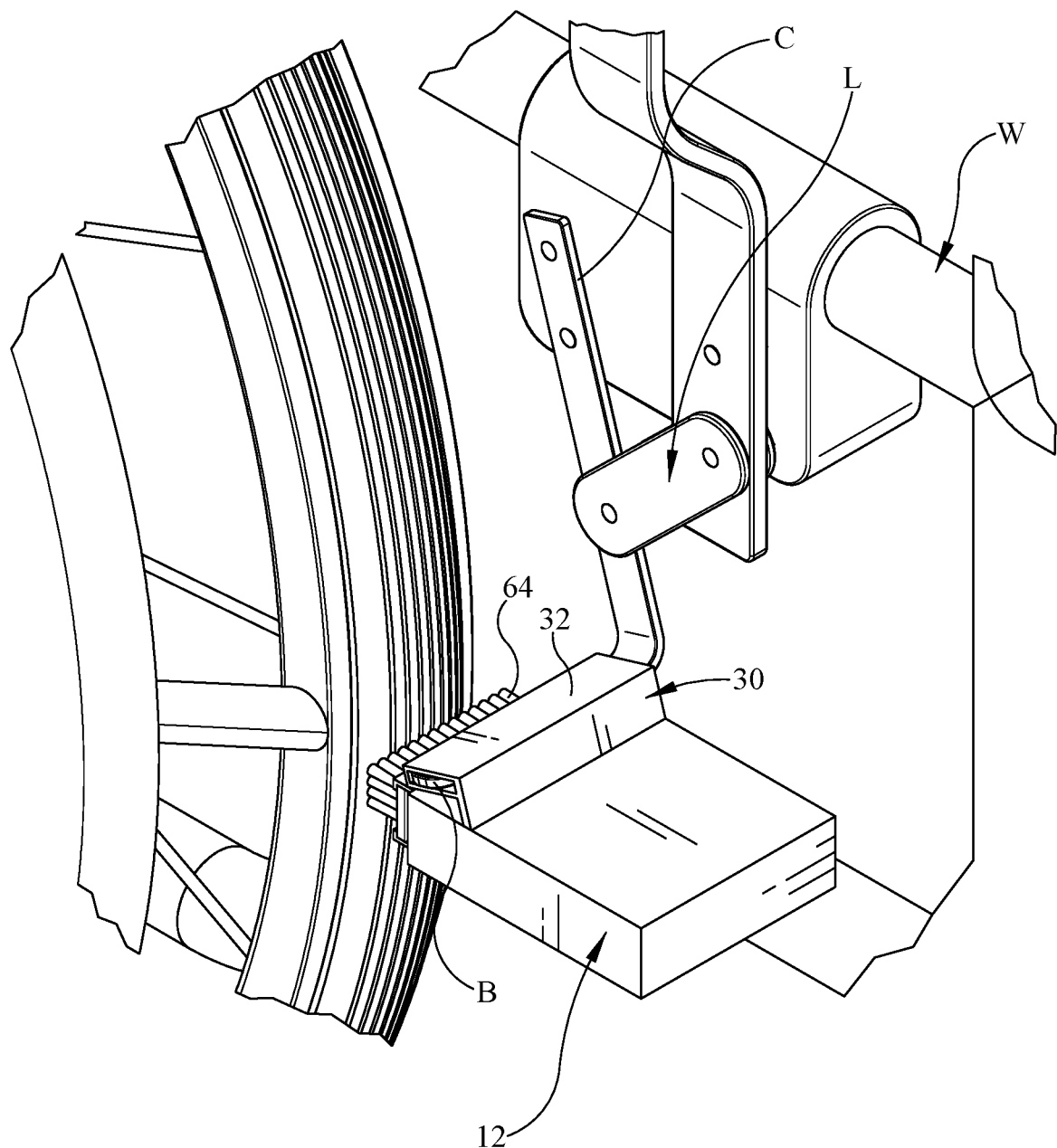
FIG. 2 is a close-up perspective view of the wheel brush for a wheelchair installed on the wheelchair.
Figure 3:
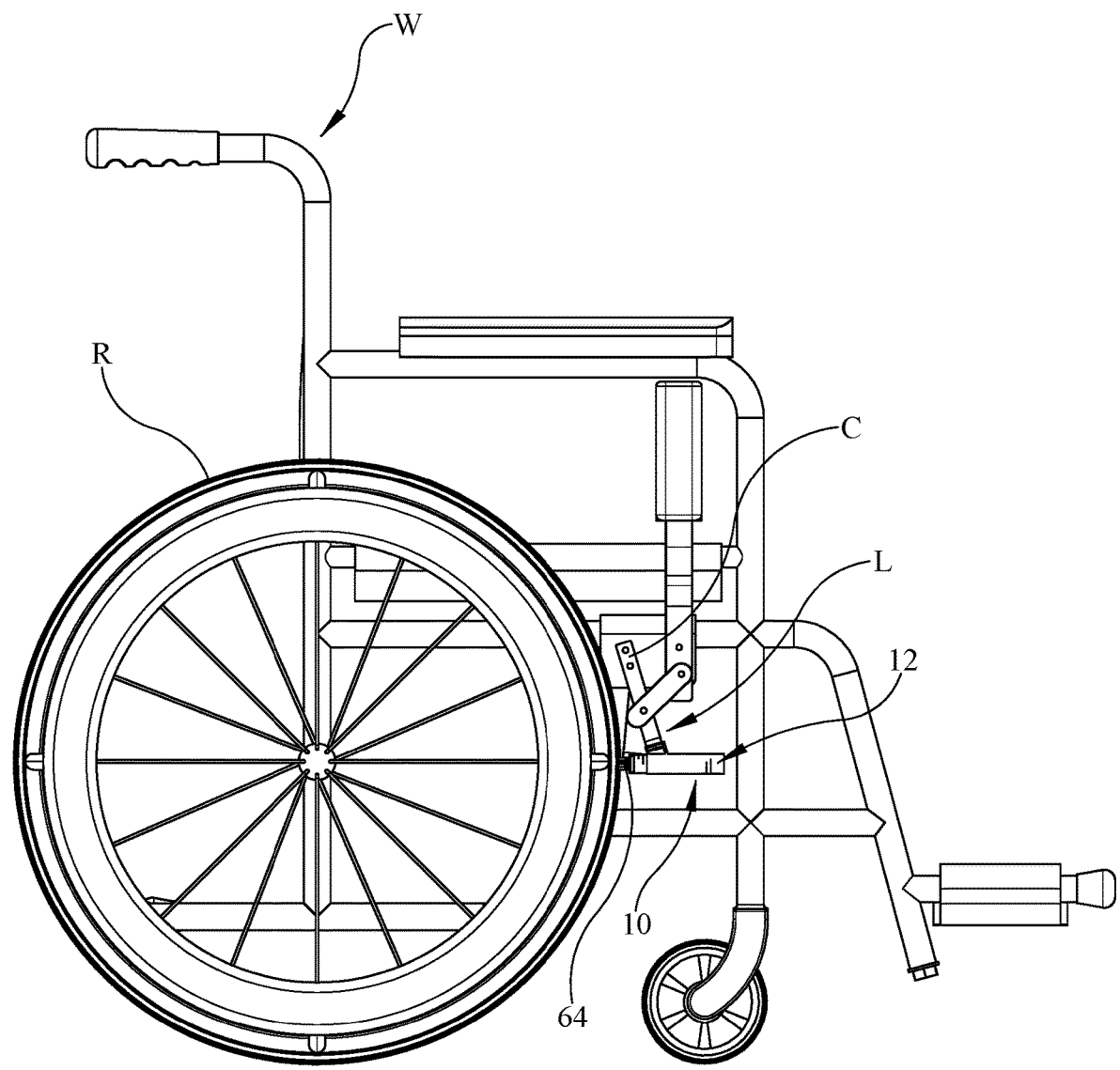
FIG. 3 is side view of the wheel brush for a wheelchair attached to the wheelchair.
Figure 4:
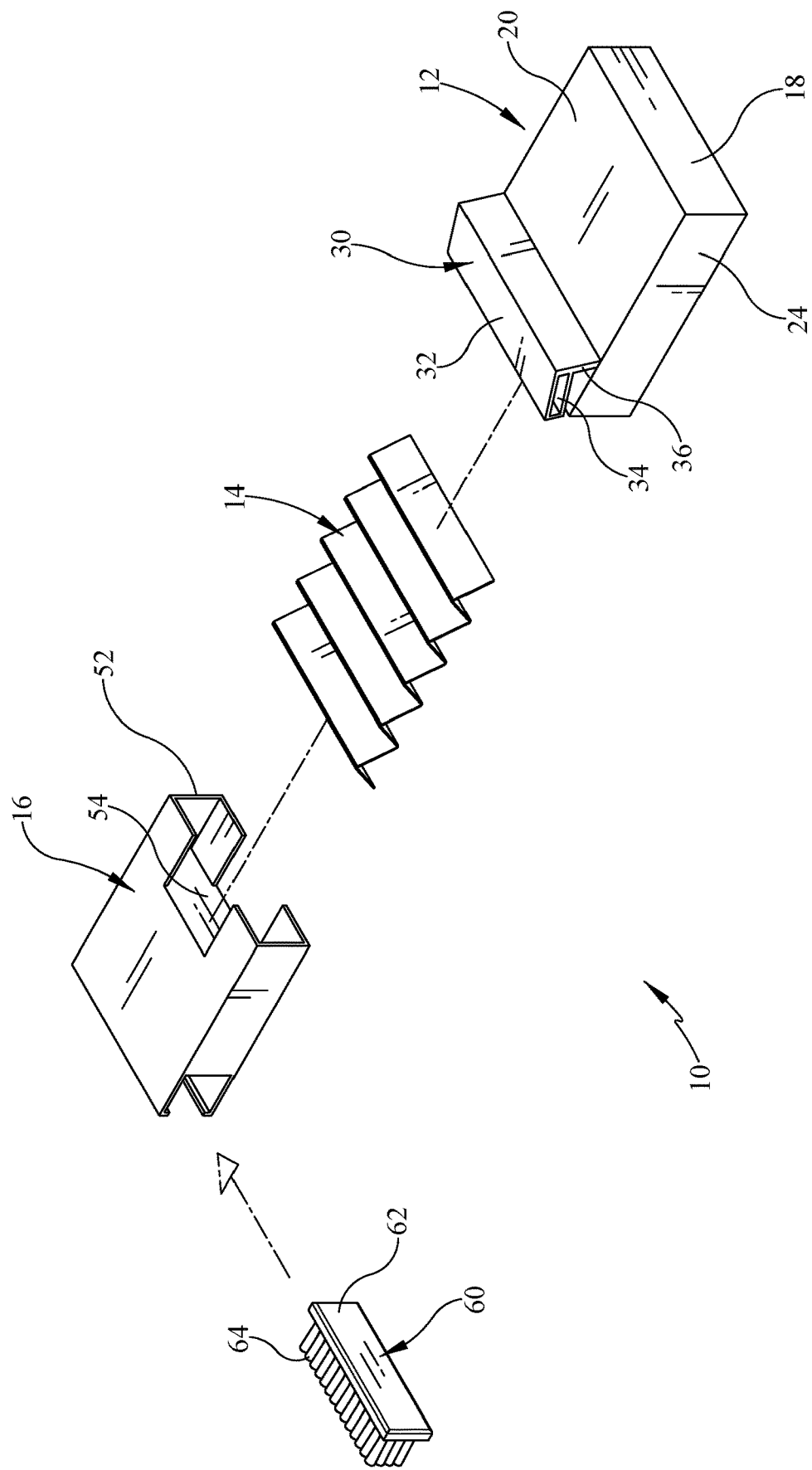
FIG. 4 is an exploded perspective view of the wheel brush for a wheelchair.
Figure 5:
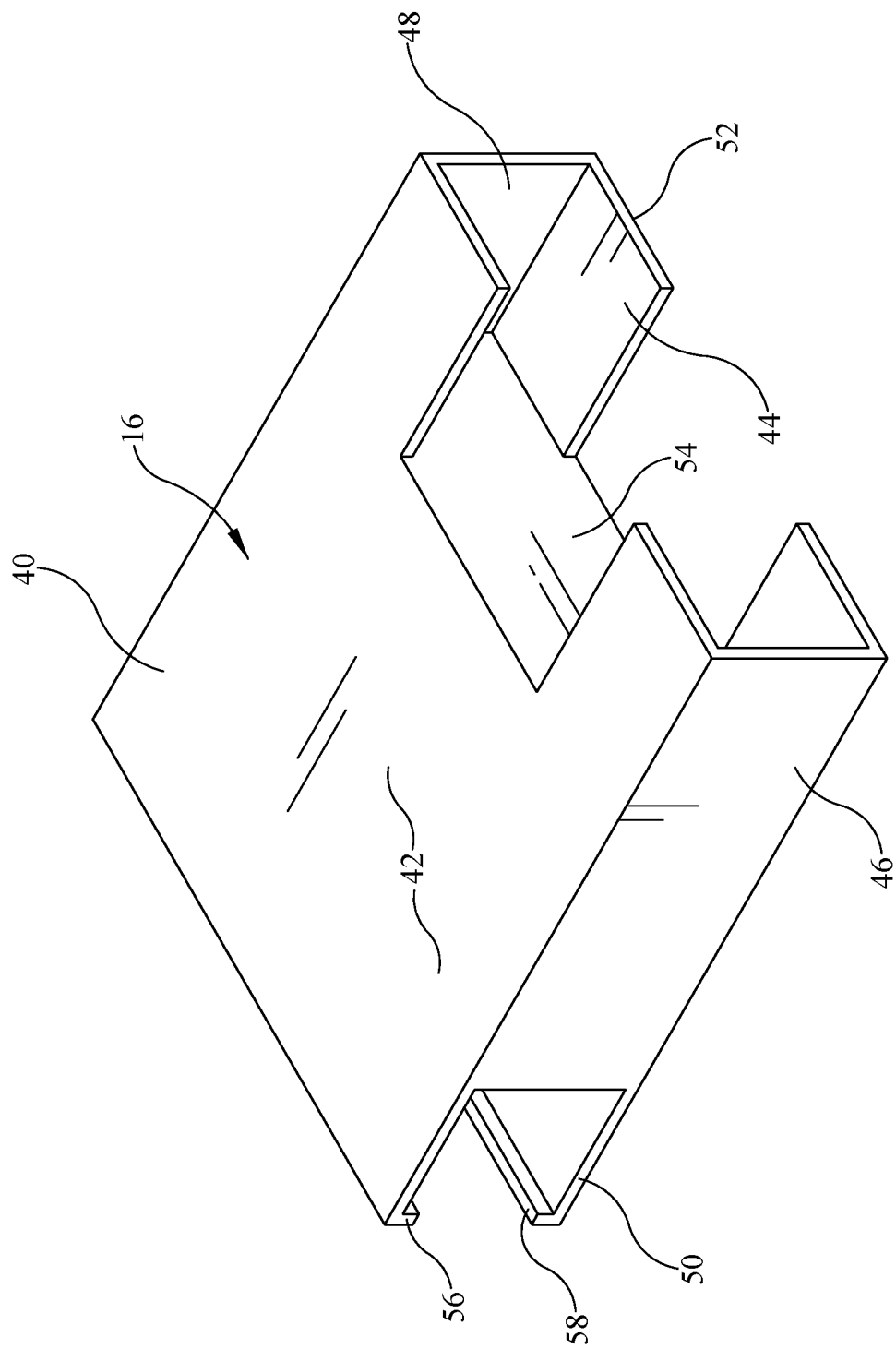
FIG. 5 is a perspective view of the brush housing of the wheel brush for a wheelchair.
Figure 6:
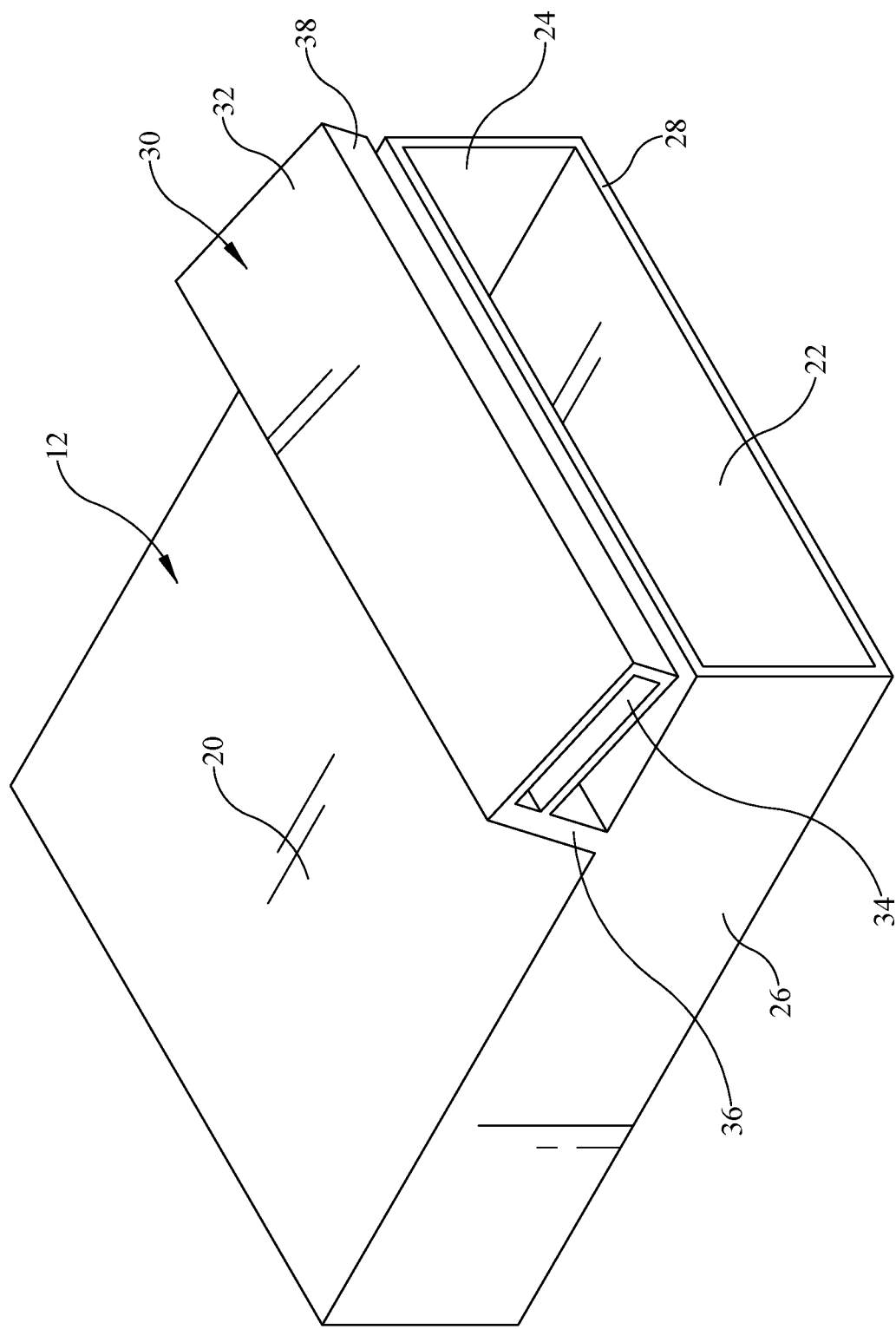
FIG. 6 is a perspective view of the main housing of the wheel brush for a wheelchair.

Referring now to the drawings, it is seen that the wheel brush for a wheelchair of the present invention, generally denoted by reference numeral 10, is comprised of a main housing 12, an accordion spring 14, and a brush assembly 16 that is slidably received within the main housing 12 with the spring 14 disposed within the main housing 12 abutting the main housing 12 and the brush assembly 16.

As seen, the main housing 12 is a generally rectangular box member that has a closed back end 18, an upper face 20 and a parallel lower face 22, joined by a first side 24 and a second side 26. The main housing 12 has an open front end 28 leading to a hollow interior. An attachment mount 30 is attached to the upper face 20 of the main housing 12, transverse to the longitudinal axis of the main housing 12 (the attachment mount 30 extends between the first side 24 and the second side 26). The attachment mount 30 comprises a mount member 32 which is a generally rectangular member that has a channel 34 extending along its length and a post 36 that attaches the mount member 32 to the upper face 20 of the main housing 12 in any appropriate fashion. The channel 34 of the attachment mount 30 is sized and dimensioned to snugly receive the brake arm B of a wheellock assembly L of a wheelchair W. As seen, the outside edge 38 of the mount member 32 is positioned just beyond the front end 28 of the main housing 12. The mount member 32 is attached to the main housing 12 via the post at a non-right angle in order to allow the outside edge 38 of the mount member 32 to act as a brake as more fully discussed below. The main housing 12 and the attachment mount 30 are each made from an appropriate sturdy material such as aluminum or hard plastic.

The brush assembly 16 is a generally rectangular body member 40 that has a top surface 42 and a bottom surface 44 joined by a left side 46 and a right side 48. Both a first end 50 and a second end 52 of the body member 40 are open while a stop plate 54 is disposed within the body member 40 medially between the first end 50 and the second end 52. As seen the left side 46 discontinues prior to reaching the first end 50. The right side 48 may, but need not necessarily also discontinue prior to reaching the first end 50. A downwardly directed upper lip 56 extends along the edge of the top surface 42 at the first end 50 while an upwardly directly lower lip 58 extends along the edge of the bottom surface 44 at the first end 50—the lower lip 58 faces the upper lip 56 thereby forming a transverse channel at the first end 50. The central part of the top surface 42 and/or the central part of the bottom surface 44 may be notched at the second end 52. The body member 40 is dimensioned to be able to be slidably received within the main housing 12 through the main housing's front end 28. A brush 60 has a base plate 62 and a series of bristles 64 extending from one side of the base plate 62. The width of the base plate 62 is greater than the distance between the upper lip 56 and the lower lip 58 but less than the distance between the top surface 42 and the bottom surface 44 of the body member 40. The brush 60 is received within the body member 40 by sliding the base plate 62 of the brush 60 laterally into the opening created by the discontinuity on the left side 46 at the first end 50 in dovetail fashion. If the right side 48 of the body member 40 lacks a discontinuity at the first end 50, then the right side 48 acts as a stop for the brush. As the width of the base plate 62 of the brush 60 is less than the width between the upper lip 56 and the lower lip 58, the brush 60 cannot be removed longitudinally out through the first end 50 of the body member 40. The bristles 64 are dimensioned so that when the brush 60 is received within the body member 40, the bristles extend past the first end 50 of the body member 40. The brush 60 may have any desired bristle configuration.

In order to use the wheel brush for a wheelchair 10 of the present invention, a desired brush 60 is selected with a desired bristle configuration and installed within the body member 40 by sliding the brush 60 into the body member 40 as previously described. The spring 14 is slid into the interior of the main housing through the front end 28. Thereafter, the body member 40 is slid into the main housing 12 through the front end 28. One end of the spring 14 abuts the back end 18 of the main housing 12 while the opposing end of the spring 14 abuts the stop plate 54 of the body member 40. The spring constant of the spring 14 is such that the brush 60 and possibly a small portion of body member 40 extend beyond the front end 28 of the main housing 12. The wheel brush for a wheelchair 10 is attached to the wheellock assembly L of the wheelchair W by sliding the mount member 32, via its channel 34, onto the brake arm B of the wheellock assembly L so that the bristles 64 of the brush 60 face the rear wheel R of the wheelchair W. When the wheellock assembly L is in the unlocked position, the bristles 64 of the brush 60 are positioned near the rear wheel R or may actually be slightly touching the rear wheel R. As the wheelchair W is rolled about a ground surface and a user wants to clean the rear wheel R (if the bristles 64 of the brush 60 are in contact with the rear wheel R when the wheellock assembly L is in the unlocked position, then the bristles 64 constantly brush the rear wheel R imparting a cleaning action thereonto), the user moves control lever C of the wheellock assembly L toward the locked position. This causes the bristles 64 of the brush to push against the rear wheel R so as to push the brush assembly 16 into the main housing 12. When the control lever C is moved sufficiently toward the locked position, the spring 14 will be sufficiently compressed so that it biases the brush assembly with sufficient force to that the bristles 64 of the brush 60 engage the rear wheel R of the wheelchair W with sufficient pressure so as to impart a cleaning action onto the rear wheel R. If more pressure is needed, the control lever C is moved more toward the locked position. The rotating wheel R is brushed by the bristles 64 of the brush 60 thereby removing dirt and debris from the rear wheel R as the rear wheel R rotates. A second wheel brush for a wheelchair 10 is installed in similar fashion on the opposite side of the wheelchair W in order to clean the other wheel R.

If the user desires to lock the rear wheel R, the control lever C of the wheellock assembly L is moved all the way to its locked position. As the outside edge 38 of the mount member 32 is positioned just beyond the front end 28 of the main housing 12, the outside edge 38 presses against the rear wheel R and frictionally holds the rear wheel W in the same manner as does the brake arm B when the present invention is not installed.

Whenever the brush 60 needs to be changed, either to be cleaned or simply replaced due to being worn out or to use a different bristle configuration, the brush 60 is slid out of the body member 40 and a new brush 60 is slid back thereinto (or the old brush 60 is reinstalled after being cleaned).

While the invention has been particularly shown and described with reference to an embodiment thereof, it will be appreciated by those skilled in the art that various changes in form and detail may be made without departing from the spirit and scope of the invention.

I claim:

1. A brush for a wheelchair, the wheelchair having a pair of rear wheels and a wheellock assembly that has a brake arm that frictionally engages one of the rear wheels of the wheelchair under the control of a control lever, the brush comprising:
   a main housing having a closed back end an and open front end and a hollow interior;
   a mount member, having an outside edge, the mount member attached to a surface of the main housing, the mount member having a channel that runs transverse to a longitudinal axis of the main housing, the channel dimensioned and adapted to receive the brake arm therein;
   a brush assembly having a brush head with series of bristles, the brush assembly slidably disposed within the main housing such that a portion of the bristles extends outside of the front end of the main housing;
   a spring having a first end abutting the back end of the main housing and an opposing second end abutting the brush assembly; and
   wherein the mount member is attached to the brake arm of the wheellock assembly of the wheelchair by sliding the channel of the mount member over the brake arm so that the bristles are facing the rear wheel and the spring biases the bristles toward the rear wheel.

2. The brush for a wheelchair as in claim 1 wherein the outside edge of the mount member is positioned beyond the front end of the main housing so that when the wheellock assembly is in a fully locked position, the outside edge of the mount member frictionally engages the rear wheel.

3. The brush for a wheelchair as in claim 2 wherein the mount member is attached to the surface of the main housing via a post such that the post is oriented at a non-right angle with respect to the surface of the main housing.

4. The brush for a wheelchair as in claim 1 wherein the main housing is rectangular in shape.

5. The brush for a wheelchair as in claim 1 in combination with the wheelchair.

6. The brush for a wheelchair as in claim 5 wherein the outside edge of the mount member is positioned beyond the front end of the main housing so that when the wheellock assembly is in a fully locked position, the outside edge of the mount member frictionally engages the rear wheel.

7. The brush for a wheelchair as in claim 6 wherein the mount member is attached to the surface of the main housing via a post such that the post is oriented at a non-right angle with respect to the surface of the main housing.

8. The brush for a wheelchair as in claim 5 wherein the main housing is rectangular in shape.

9. A brush for a wheelchair, the wheelchair having a pair of rear wheels and a wheellock assembly that has a brake arm that frictionally engages one of the rear wheels of the wheelchair under the control of a control lever, the brush comprising:
   a main housing having a closed back end an and open front end and a hollow interior;
   a mount member, having an outside edge, the mount member attached to a surface of the main housing, the mount member having a mount channel that runs transverse to a longitudinal axis of the main housing, the mount channel dimensioned and adapted to receive the brake arm therein;
   a body member having a first end with a transverse channel and a second end and a stop plate therebetween, the body member slidably disposed within the main housing;
   a brush head with series of bristles, the brush head slidably received within the transverse channel of the body member and held thereat in dovetail fashion such that a portion of the bristles extends outside of the front end of the main housing;
   a spring having a first end abutting the back end of the main housing and an opposing second end abutting the stop plate of the body member; and
   wherein the mount member is attached to the brake arm of the wheellock assembly of the wheelchair by sliding the channel of the mount member over the brake arm so that the bristles are facing the rear wheel and the spring biases the bristles toward the rear wheel.

10. The brush for a wheelchair as in claim 9 wherein the outside edge of the mount member is positioned beyond the front end of the main housing so that when the wheellock assembly is in a fully locked position, the outside edge of the mount member frictionally engages the rear wheel.

11. The brush for a wheelchair as in claim 10 wherein the mount member is attached to the surface of the main housing via a post such that the post is oriented at a non-right angle with respect to the surface of the main housing.

12. The brush for a wheelchair as in claim 9 wherein the main housing is rectangular in shape.

13. The brush for a wheelchair as in claim 12 wherein the body member is rectangular in shape.

14. The brush for a wheelchair as in claim 9 in combination with the wheelchair.

15. The brush for a wheelchair as in claim 14 wherein the outside edge of the mount member is positioned beyond the front end of the main housing so that when the wheellock assembly is in a fully locked position, the outside edge of the mount member frictionally engages the rear wheel.

16. The brush for a wheelchair as in claim 15 wherein the mount member is attached to the surface of the main housing via a post such that the post is oriented at a non-right angle with respect to the surface of the main housing.

17. The brush for a wheelchair as in claim 14 wherein the main housing is rectangular in shape.

18. The brush for a wheelchair as in claim 17 wherein the body member is rectangular in shape.

* * * * *